United States Patent

[11] 3,595,069

| [72] | Inventor | Kenneth A. Fowler |
| | | Medfield, Mass. |
| [21] | Appl. No. | 799,333 |
| [22] | Filed | Feb. 14, 1969 |
| [45] | Patented | July 27, 1971 |
| [73] | Assignee | Panametrics, Inc. |
| | | Waltham, Mass. |

[54] ULTRASONIC SENSING SYSTEM
11 Claims, 2 Drawing Figs.

| [52] | U.S. Cl. | 73/67.2, 73/67.9 |
| [51] | Int. Cl. | G01n 24/00 |
| [50] | Field of Search | 73/67.5–.9, 67.1, 67.2 |

[56] References Cited
UNITED STATES PATENTS

| 2,467,301 | 4/1949 | Firestone | 73/67.9 |
| 3,106,838 | 10/1963 | Crooks | 73/67.2 |
| 3,145,559 | 8/1964 | Banks | 73/67.2 X |
| 3,186,226 | 6/1965 | Milnes et al. | 73/67.2 X |
| 3,250,119 | 4/1966 | Roberts | 73/67.2 |
| 3,256,733 | 6/1966 | Carlin | 73/67.8 |
| 3,323,352 | 6/1967 | Branson | 73/67.1 |
| 3,427,866 | 2/1969 | Weighart | 73/67.9 X |
| 3,482,435 | 12/1969 | Gunkel | 73/67.9 |

*Primary Examiner*—Richard C. Queisser
*Assistant Examiner*—Arthur E. Korkosz
*Attorney*—Kenway, Jenney & Hildreth ABSTRACT: The system disclosed herein employs an ultrasonic sensor having an acoustic resonance frequency which is a function of a parameter to be measured. Acoustic energy is applied to the sensor in a single pulse having a duration which is on the order of half the period of the nominal resonance frequency of the sensor. The sensor then rings substantially at its exact resonance frequency. After a delay which permits transient effects to die out, the ringing frequency is determined by timing several cycles of the ringing, the frequency so determined being indicative of the value of the sensed parameter.

3,595,069

INVENTOR.
KENNETH A. FOWLER
BY
Kenway, Jenney + Hildreth
ATTORNEYS

ULTRASONIC SENSING SYSTEM

BACKGROUND OF THE INVENTION

This invention relates to ultrasonic sensing systems and more particularly to such a system employing impulse-induced sensor resonance.

Heretofore, it has been proposed to determine the resonance frequency of a resonant ultrasonic sensor by applying to the sensor either a narrow-band continuous-wave signal, e.g., bursts of R.F., or a continuous random noise or broad band signal. In the former case, it is necessary to tune the single frequency of the source to exactly match the sensor's resonant frequency in order to obtain the desired measurement. In the latter case, no tuning of the source is necessary but extensive filtering and signal processing must be done to extract the fundamental resonant frequency or overtones of that frequency from the noise spectrum.

Among the several objects of the present invention may be noted the provision of an ultrasonic sensing system employing a resonant sensor in which the resonance frequency of the sensor may be easily and accurately determined; the provision of such a system in which it is not necessary to tune an exciting source; the provision of such a system in which complex signal processing is not required in order to extract the desired signal from the sensor; the provision of such a system which can operate automatically; and the provision of such a system which is relatively simple and inexpensive. Other objects and features will be in part apparent and in part pointed out hereinafter.

SUMMARY OF THE INVENTION

Briefly, an ultrasonic sensing system of the present invention is adapted to measure a parameter which determines or affects the acoustic resonance frequency of an ultrasonic sensor. This parameter may in fact be a property of the sensor material itself. The system employs signal coupling means, including at least one electroacoustic transducer, for applying acoustic energy to the sensor and for detecting acoustic energy present in the sensor. A pulse generator is interconnected with the signal coupling means for selectively applying single interrogating pulses to the sensor, each such pulse having a duration which is in the order of T/2 where T is the period of the nominal resonance frequency of the sensor. After a delay following the completion of an interrogating pulse, a timing means interconnected with the signal coupling means determines the frequency of ringing induced in the sensor by the interrogating pulse. The frequency so determined is then indicative of the value of the parameter.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
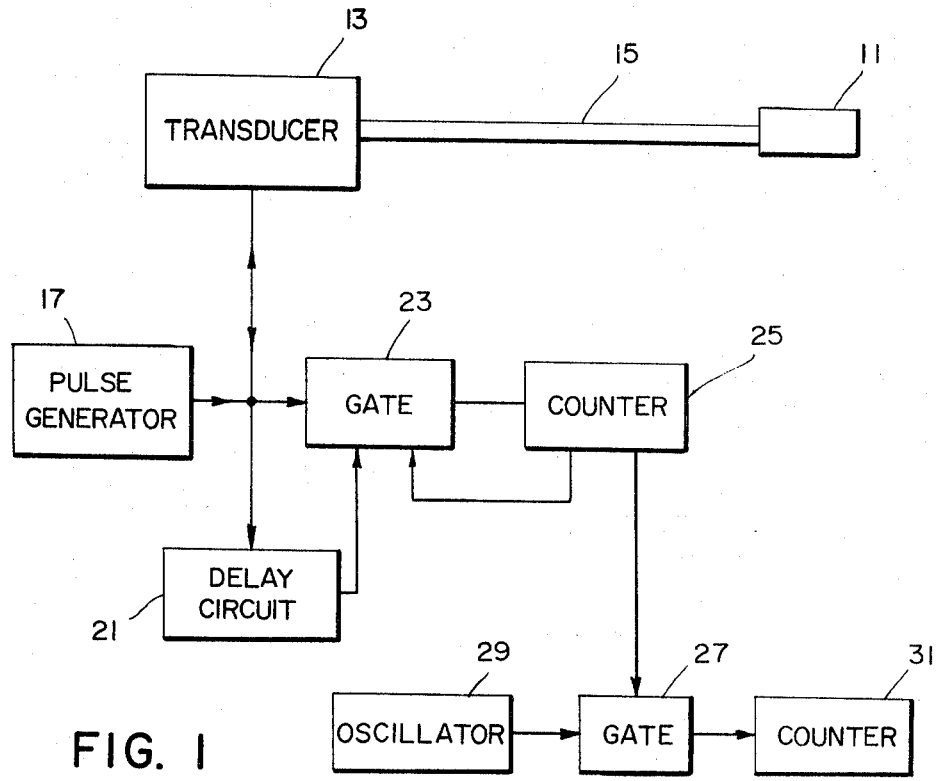
FIG. 1 is a block diagram of an ultrasonic sensing system of the present invention.

Referring now to FIG. 1, there is indicated at 11 a resonant ultrasonic sensor. In the following description, the system illustrated is assumed to be a temperature measuring system and thus the sensor 11 is selected to have a resonance frequency which varies, relative to some nominal value, as a function of temperature. The period of the nominal resonance frequency of the sensor 11 is designated T. The sensor 11 may, for example, comprise a short cylindrical rod constructed of a variety of ceramic materials, having physical characteristics which vary with temperature. As will be understood by those skilled in the art, however, other parameters may also be measured by detecting changes in the resonance frequency of appropriately selected sensors.

An electroacoustic transducer 11, e.g. a magnetostrictive or a piezoelectric transducer, is bidirectionally coupled to sensor 11 by means of a conventional acoustic lead-in, designated 15. Transducer 13 and lead-in 15 thus constitute a signal coupling means for applying acoustic energy or signals to sensor 11 and for detecting acoustic energy or signals present or stored in the sensor. The lead-in 15 preferably provides a delay substantially longer than T to prevent spurious reflections or resonances. A pulse generator 17 is interconnected with transducer 13 for applying single interrogating pulses of preselected duration to the sensor. Such an interrogating pulse is indicated at 19 in the waveform diagram of FIG. 2.

The pulses provided by generator 17 are also applied to a delay circuit 21 for initiating a predetermined delay interval. This interval is selected, as described in greater detail hereinafter, to provide a delay sufficient for an interrogating acoustic pulse to travel the length of lead-in 15 to the sensor 11 for resulting acoustic resonance signals from the sensor to travel back to the transducer 13. The delay circuit 21 controls the opening of a gate circuit 23 which is interconnected with the transducer 13 for selectively passing signals obtained from sensor 11 to a counter 25. Counter 25 in turn controls the closing of the gate circuit 23 and also controls the opening and closing of a gate circuit 27. Gate circuit 27 is operative to selectively pass the output signal of a relatively high frequency oscillator 29 to a digital counter 31. Oscillator 29 is a relatively stable oscillator which establishes an appropriate time base and thus the oscillator 29, the gate 27 and the counter 31 together comprise a digital clock or period-measuring timing apparatus.

The operation of this system is substantially as follows. For each cycle of operation, the pulse generator 17 provides a single pulse as indicated at 19 in FIG. 2. The duration of the pulse, i.e. the so-called pulse width, is selected to be in the order of T/2, that is, half the period of the nominal resonance frequency of sensor 11. The corresponding acoustic pulse provided by transducer 13 travels down the lead-in 15 and, upon reaching the sensor 11, causes the sensor to ring at its resonance frequency. As the sensor 11 rings or resonates, a portion of the stored oscillatory energy is gradually drained off by the lead-in 15 and transmitted back to the transducer 13 thereby providing a signal, as indicated generally at 35, which represents the resonant vibration of the sensor. The acoustic impedance of the lead-in 15 is selected in relation to that of the sensor 11 to provide adequate signal strength without overly damping the sensor.

Figure 2:
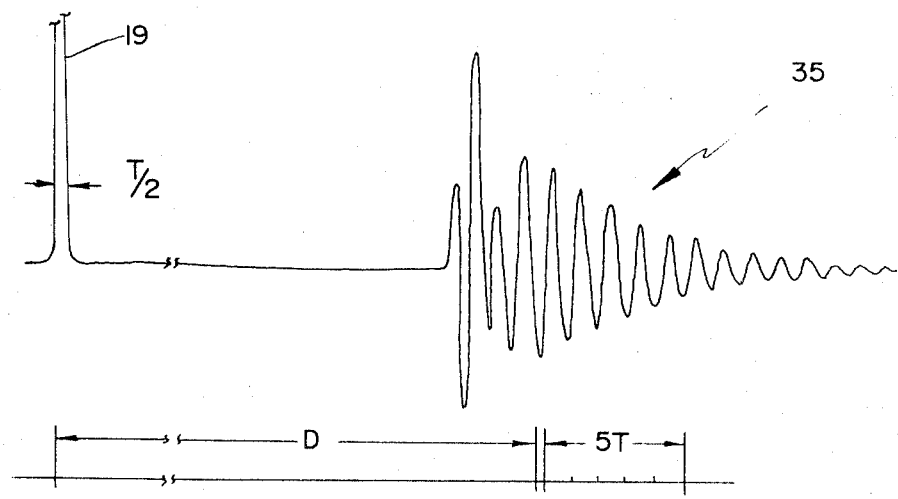
FIG. 2 represents a waveform characteristic of the resonant ultrasonic sensor employed in the system of FIG. 1.

As may be seen in FIG. 2, the initial response of the sensor is complicated by transient effects but, after a short delay, the waveform essentially follows a damped sinusoidal function. The delay provided by the circuit 21 is indicated at D in FIG. 2 and is selected so that the gate 23 is opened to pass signals from transducer 13 only after the transient effects just described have died out. In other words a portion of the delay D counteracts the delay due to the lead-in and another portion allows the transient effects to die out. After the delay D, the counter 25 then counts successive cycles of the damped sinusoidal signal provided by the ringing of the sensor 11. Preferably, the operation of gate 23 and counter 25 is such that the counter responds or advances at a precisely predetermined point within each oscillatory cycle, e.g. a count of six is reached. In FIG. 2, the 5 cycle time interval between the six successive positive-going zero crossings following the delay interval D is designated as 5T.

The counter 25 opens the gate 27 during the interval between the first and last counts, that is, for a time interval equal to the period of 5 cycles of the frequency at which sensor 11 rings. The counter 31 will thus be advanced by a number which is proportional to or representative of this period. This number is thus also a measure of the actual resonance frequency of sensor 11. Assuming that the correspondence between the actual resonance frequency of the sensor 11 and its temperature is known, the time interval measured by counter 31 is then also a measure or indication of temperature. It can be seen that the operation is automatic in the sense that tuning or adjusting is not needed to make a measurement. It desired, the pulse generator 17 can operate repetitively, the counters 25 and 31 being reset prior to the initiation of each interrogating pulse, to provide an essentially continuous measurement of the sensed parameter.

As compared with conventional ultrasonic pulse echo sensing systems, the system of the present invention is advantageous in that it permits the use of relatively small sensors constructed of a variety of materials, such as ceramics, having high propagation velocities. Metals, plastics and composites may also be used. Small sensors are possible since the present method does not require that the pulse length be short in relation to the delay or transmit time of the sensor. Rather, the pulse width used in the system of the present invention is in the order of T/2 where T is the period of the nominal resonance frequency of the sensor acting as half-wave or quarter-wave resonator, the period of this resonance frequency being determined by the length and sound velocity of the sensor and whether the sensor 11 is a half-wave resonator or a quarter-wave resonator. The use of small sensors is particularly advantageous where it is necessary to measure localized temperatures, e.g. in small furnaces or in systems having steep temperature gradients.

Further, the present sensing system facilitates the use of digital timing techniques, as illustrated, for determining the resonance frequency of the sensor. Thus very precise measurements may be obtained quickly and easily. On the other hand, precision analog timing techniques may also be used.

Instead of providing a predetermined delay to eliminate the delay required by the lead-in and for transient effects to die down, the apparatus may be arranged to wait until a preselected number of pulsations or cycles have occurred, following an interrogating pulse, before measuring the resonance frequency. In this way, lead-ins of different length may be used without adjusting a preselected delay time.

This system is also useful in determining physical characteristics, e.g. young's modulus of elasticity or attenuation characteristics, of a given material, a sample of the material being employed as the resonator or sensor 11. Assuming that longitudinal, i.e. extensional, ultrasonic waves are used, the dimensions of the sample or sensor can vary over a wide range. For example, even short thin fibers of mechanical impedance less than that of the lead-in can be used as quarter-wave resonators. The same method described in detail for extensional waves can also be employed with torsional waves to measure temperature or material properties.

Further, the sensor orientation is not restricted to coaxial alignment with the lead-in but may be at an angle to it, oblique or even perpendicular to the lead-in line. Additionally, the same concept described herein can in principle be applied to acoustic lines and sensors constructed of a liquid or gas sound transmission path.

It is also possible to make simultaneous impulse induced resonance measurements using extensional and torsional waves on the same line. Both modes can be generated by the Joule-Wiedemann effect. If a tube is used as a lead-in and a solid cylinder as the sensor, the dimensions of these elements can be selected so that both waves experience a mechanical impedance mismatch. Further, the dimensions of the tube and rod can be made such that both wave modes experience the same impedance mismatch or if this is undesirable, for example, because of attenuation, the impedance mismatch for one mode can be made greater than for the other. Because of the different speed of the two wave modes, it is possible to observe the sensor resonance induced by the two modes at different times after the initial pulse. Multiple sensors and multiple modes are described in copending application Ser. No. 730,872 filed May 21, 1968 by L. C. Lynnworth and entitled Dual Ultrasonic Sensors Employing Differing Modes of Ultrasonic Transmission now U.S. Pat. No. 3,540,265. Sensors of the type described in that application can also be considered for impulse induced resonance with appropriate impedance matching.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What I claim is:

1. An ultrasonic sensing system for measuring a given parameter, said system comprising:

a sensor having an acoustic resonance frequency which varies as a predetermined, relatively continuous function of said parameter;

signal coupling means, including at least one electroacoustic transducer, for applying acoustic energy to said sensor and for detecting acoustic energy present in said sensor;

an electrical pulse generator interconnected with said signal coupling means for applying single interrogating pulses to said sensor, each such pulse having a duration which is in the order of T/2 where T is the period of the nominal resonance frequency of said sensor; and means interconnected with said signal coupling means and operative following an interrogating pulse for determining the frequency of ringing induced in said sensor by the pulse, the frequency so determined being indicative of the value of said parameter.

2. A system as set forth in claim 1 wherein the same transducer is employed for applying acoustic energy to and detecting acoustic energy in said sensor.

3. A system as set forth in claim 2 wherein said transducer is coupled to said sensor through a lead-in providing a delay which is substantially longer than the nominal resonance period T.

4. A system as set forth in claim 1 the resonance frequency of said sensor varies as a function of temperature whereby the frequency determined by said frequency determining means is indicative of the temperature of said sensor.

5. A system as set forth in claim 1 wherein the frequency determined by said frequency determining means is indicative of the modulus of elasticity of the material of said sensor.

6. A system as set forth in claim 1 wherein said frequency determining means comprises timing means for measuring the period of the frequency of ringing.

7. A system as set forth in claim 1 wherein said frequency determining means includes a gate circuit for selectively passing signals from said transducer and a delay circuit for opening said gate only after a predetermined delay following an interrogating pulse.

8. A system as set forth in claim 7 where the delay provided by said delay circuit includes a portion permitting transient effects in the ringing induced by an interrogating pulse to die out.

9. A system as set forth in claim 8 wherein said transducer is coupled to said sensor through a lead-in providing a delay which is substantially longer than the nominal resonance period T and wherein the delay provided by said delay circuit includes a portion permitting said interrogating pulse to reach said sensor through said lead-in and for signals returned from said sensor to reach said transducer through said lead-in.

10. An ultrasonic sensing system for measuring a given parameter, said system comprising:

a sensor having an acoustic resonance frequency which varies around a nominal value as a predetermined, relatively continuous function of said parameter; an electroacoustic transducer for applying acoustic energy to said sensor and for detecting acoustic energy present in said sensor; an electrical pulse generator interconnected with said transducer for applying single interrogating pulses to said sensor, each such pulse having a duration which is in the order of T/2 where T is the period of the nominal resonance frequency of said sensor; and timing means interconnected with said transducer and operative after a predetermined delay following an interrogating pulse for measuring the interval required for a predetermined number of cycles of ringing induced in said sensor by the pulse, the interval so measured being indicative of the value of said parameter.

11. The method of determining the value of a given parameter comprising:

providing an ultrasonic sensor having an acoustic resonance frequency which varies around a nominal value as a predetermined, relatively continuous function of said parameter; applying to said sensor a single interrogating pulse having a duration which is in the order of T/2 where T is the period of the nominal resonance frequency of said sensor; and measuring the time interval required for a predetermined number of cycles of ringing induced in said sensor by said interrogating pulse, whereby the time interval so measured in indicative of the value of said parameter.

PO-1050
(5/69)

UNITED STATES PATENT OFFICE
CERTIFICATE OF CORRECTION

Patent No. 3,595,069      Dated July 27, 1971

Inventor(s) Kenneth A. Fowler

It is certified that error appears in the above-identified patent and that said Letters Patent are hereby corrected as shown below:

Column 2, line 18, after "11" insert --and--;
Column 2, line 56, "due" should be --die--;
Column 2, line 62, after "cycle," but before "e.g.", insert --e.g. at the positive-going zero crossing. Counter 25 then closes the gate circuit 23 when a predetermined count,--;
Column 3, line 14, "transmit" should be --transit--;
Column 3, line 38, "young's" should be --Young's--;
In claim 11, column 6, line 9, "in" should be --is--.

Signed and sealed this 25th day of January 1972.

(SEAL)
Attest:

EDWARD M. FLETCHER, JR.    ROBERT GOTTSCHALK
Attesting Officer       Commissioner of Patents